United States Patent [19]
Seymour

[11] 4,322,933
[45] Apr. 6, 1982

[54] STONE TRAPDOOR TRIP MECHANISM
[75] Inventor: Shaun A. Seymour, New Holland, Pa.
[73] Assignee: Sperry Corporation, New Holland, Pa.
[21] Appl. No.: 181,273
[22] Filed: Aug. 25, 1980
[51] Int. Cl.[3] .............................................. A01F 12/10
[52] U.S. Cl. .................................. 56/10.2; 130/27 JT
[58] Field of Search ........................ 56/10.2, DIG. 15; 130/27 JT, 27 R

[56] References Cited
U.S. PATENT DOCUMENTS

| | | | |
|---|---|---|---|
| 3,576,188 | 4/1971 | Tanis | 130/27 JT |
| 3,643,666 | 2/1972 | Denison | 130/27 JT |
| 3,675,660 | 7/1972 | Girodat | 130/27 JT |
| 3,756,248 | 9/1973 | Mathews | 130/27 JT |
| 3,971,390 | 7/1976 | McDuffie | 130/27 JT |
| 4,146,038 | 3/1979 | DeBusscher | 130/27 JT |

*Primary Examiner*—Jay N. Eskovitz
*Attorney, Agent, or Firm*—Larry W. Miller; Frank A. Seemar

[57] ABSTRACT

In a harvesting and threshing machine having stone sensing apparatus mounted within an infeed housing, the infeed housing being mounted to the machine and effective to receive crop material from a header and convey the crop material via a crop elevator from the header to threshing and separating apparatus within the machine, there is provided a solenoid activated spring wound clutch connectable to the stone sensing apparatus effective upon activation of the stone sensing apparatus to release the ejection apparatus fastened to the infeed housing to eject the detected object from the infeed housing prior to its being conveyed to the threshing and separating apparatus.

6 Claims, 5 Drawing Figures

STONE TRAPDOOR TRIP MECHANISM

BACKGROUND OF THE INVENTION

This invention relates generally to crop harvesting and threshing machines, more commonly known as combines, and more particularly to the infeed housing attached to the front of the base unit of the combine which is used to transfer the crop material from the harvesting attachment or header upwards into the base unit where the threshing operation occurs. Specifically, the invention is concerned with control apparatus which responds to an input signal from the stone detecting apparatus by sending an output signal to a solenoid actuated spring wound clutch which controls the driving connection to the release mechanism for a door that is sprung open to eject the detected object before it can enter the threshing and separating apparatus of the combine.

In the prior conventional types of combines using a transverse threshing cylinder, stone traps were routinely provided to separate out large hard objects or stones that generally were greater than three or four inches in size. The stone traps provided in the conventional combines were utilized generally in two types of stone ejecting systems.

The passive type of stone ejecting system employed a stone trap with a space or gap between the top of the crop elevator or conveyor within the infeed housing and the base unit threshing apparatus. In this type of an ejecting system hard objects or stones were conveyed upwardly along with the crop material from the header through the infeed housing towards the threshing apparatus. When the crop material passed over the gap, stones by their very weight would fall down through the gap into the stone trap. Those stones that were carried along with the crop material past the stone trap were passed into contact with the threshing cylinder, which generally was rotatably mounted transversely to the longitudinal axis of the combine. If the hard objects or stones were of sufficient size so that they would not easily pass between the threshing cylinder and the threshing concaves, they would be thrown backwardly by the rotation of the cylinder into the gap or space. Thus, this particular cooperation between the threshing cylinder and the stone trap created an almost natural stone ejecting system for conventional combines. Even if a stone did pass into the threshing cylinder it made only one pass about the cylinder and across the underlying concave, usually doing minimal damage to the threshing apparatus before it was passed on through and ejected from the combine.

The second type of stone ejecting system generally employed an active system which utilized some sort of an electronic sensor, such as an acoustical transducer typically in the form of a piezoelectric disc mounted in a sensing plate in conjunction with a stone trap. The electronic sensor responded to the characteristics of the sound, such as the amplitude and frequency, that an impacting stone generated in the sensing plate. This signal would then be transferred through an electronic circuit that filtered out the range within which the amplitude and frequency was characteristic of stones. Within this characteristic spectral range the electronic circuit automatically activated a latch releasing mechanism on a door along the bottom of the infeed housing that would pivot open to permit the stones or hard objects to be ejected from the feeder house, along with a small amount of crop material.

This latter or active type of sensing system utilizing a latched trapdoor that was automatically opened upon impact of a stone or stone-like object against the sensing plate was an appreciable step forward in stone detecting and ejecting technology. However, because the stone or stone-like objects were generally passed along the predetermined path with the crop material, quite frequently when the stone trapdoor was opened the stone or stone-like objects continued to move along with the crop material and passed over the opening created by the lowered trapdoor. Frequently, the detected stones would still pass upwardly from the infeed housing into the threshing apparatus, where it would pass with the crop material about the threshing concave and the threshing cylinder. Again, because it was only a single pass of crop materuial about a portion of the conventional transverse threshing cylinder and across a relatively narrow strip of concave, detected but unejected stones still caused minimal damage to the combine.

An alternate type of active stone ejecting system utilized a pinch roll rotatably mounted in the infeed housing at a predetermined distance above the trapdoor. When a stone of sufficient size was carried by the crop elevator between the pinch roll and the trapdoor into compressive engagement therewith, the rotation of the pinch roll exerted a downward force through the stone against the trapdoor. The trapdoor was spring loaded closed so that above a predetermined pressure the door would be forced open, thereby causing the stone to be directed downwardly and out of the infeed housing through the opening created by the opened trap door. An obvious drawback to this system was the fact that large, but relatively flat stones or stone-like objects capable of passing between the pinch roll and the trapdoor were ingested into the combine where they could still damage the operating components.

The advent of rotary or axial flow type of combines with single or multiple threshing and separating rotors utilized in an orientation where the longitudinal axis of each rotor is either parallel or transverse to the longitudinal axis of the combine presented a greater need for more effective stone eliminating or ejecting systems. This increased need stems from two principal facts. Axial flow combines generally do not have a transverse threshing cylinder at the top of the infeed housing to throw or direct stones or other damage inducing objects back into the stone trap. They also pass the crop material about the periphery of each rotor as many as five or six times during threshing and separation as the crop material progresses axially along the length of each rotor.

An improved electronic stone or stone-like object detecting system was developed, as shown and described in copending U.S. patent application Ser. No. 109,932, filed Jan. 4, 1980 and assigned to the assignee of the present invention, utilizing a sensing plate that is positioned transversely across the bottom of the infeed housing astride the path of crop flow from the header to the base unit of the combine. In this type of a system the reaction time for the opening of the trapdoor is relatively short and, because the crop material in an axial flow combine makes multiple passes about the rotor as it is transferred along the length of the concave during the threshing and separating cycle, elimination of detected stones and stone-like objects becomes more critical. A stone or stone-like non-frangible object passing through an axial flow type of combine is more apt to damage the entire length of the concaves, which with their rasp or rub bars cooperate with the rotors to thresh the crop material. In marked contrast, a stone passing through a conventional type of combine with a transversely oriented threshing cylinder and underlying concave contacts only a very small portion of the concave and is therefore likely to cause relatively little damage in its single pass about a portion of the cylinder. Thus, in an improved detecting system such as that shown and described in the aforementioned copending patent application, use on an axial flow type of combine necessitates a much higher percentage of stone ejection or a system which effectively interrupts the infeed of crop material through the infeed housing to the threshing and separating rotors. Any improved ejecting or feed interrupting system operating within this new detection system must be fast acting since the crop material has been determined to move at an approximate rate of fifteen feet per second through a typical infeed housing and the typical reaction time from time of detection of a stone or stone-like object to ejection is 0.2 of a second.

The earlier mentioned active type of stone sensing system which utilized a latched trapdoor that was automatically opened upon the sensing of a stone frequently suffered from the disadvantage of not reliably opening the trapdoor with each sensing. This could result in the detected object being conveyed into the threshing and separating apparatus with the detrimental consequences noted above occurring, especially in axial flow type of combines.

The foregoing problems are solved in the design of the present invention by providing a solenoid activated spring wound clutch in a harvesting and threshing machine having a stone sensing apparatus with an infeed housing mounted to the machine which is effective to release the ejection apparatus fastened to the infeed housing to eject a detected object from the infeed housing prior to its being conveyed to the threshing and separating apparatus.

SUMMARY OF THE INVENTION

It is a principal object of the present invention to provide in a stone ejecting system for an infeed housing of a combine a stone trapdoor release mechanism that cooperates with stone sensing or detecting apparatus to reliably release the trapdoor upon detection of a stone or stone-like object by the stone detecting apparatus.

It is another object of the present invention to provide in an infeed housing for a combine a stone trapdoor release mechanism that utilizes rotary power from the crop elevator drive to open the stone trapdoor after a stone or stone-like object is detected by the stone detecting apparatus.

It is a further object of the present invention to provide in an infeed housing for a combine an actuation system for a stone or stone-like object ejection system that will remove a detected object from the infeed housing prior to its being conveyed into the threshing and separating apparatus.

It is a feature of the present invention that the stone trapdoor release mechanism is cooperative with electronic stone detecting apparatus and is activated upon detection of a stone or stone-like object by the stone detecting apparatus.

It is another feature of the present invention that a spring wound clutch is utilized to connect a constantly turning driveshaft on the infeed housing with a stone trapdoor release mechanism.

It is a further feature of the present invention that the release mechanism is spring loaded to permit the trapdoor to open more quickly.

It is an advantage of the present invention that a reliable and quickly responding stone trapdoor release mechanism is incorporated with the use of an electronic stone detecting system in a combine harvester.

It is another advantage of the present invention that the stone trapdoor release mechanism is relatively simple and low cost.

These and other objects, features and advantages are obtained by providing in a crop harvesting and threshing machine, equipped with stone sensing apparatus that cooperates with an infeed housing mounted to the machine, a solenoid activated spring wound clutch which is effective to release stone or stone-like ejection apparatus fastened to the infeed housing to eject a detected object from the infeed housing prior to its being conveyed to the threshing and separating apparatus.

BRIEF DESCRIPTION OF THE DRAWINGS

The features and advantages of this invention will become apparent upon consideraion of the following detailed disclosure of the invention, especially when it is taken in conjunction with the accompanying drawings wherein.

DETAILED DESCRIPTION OF THE PREFERRED EMBODIMENT

Figure 1:
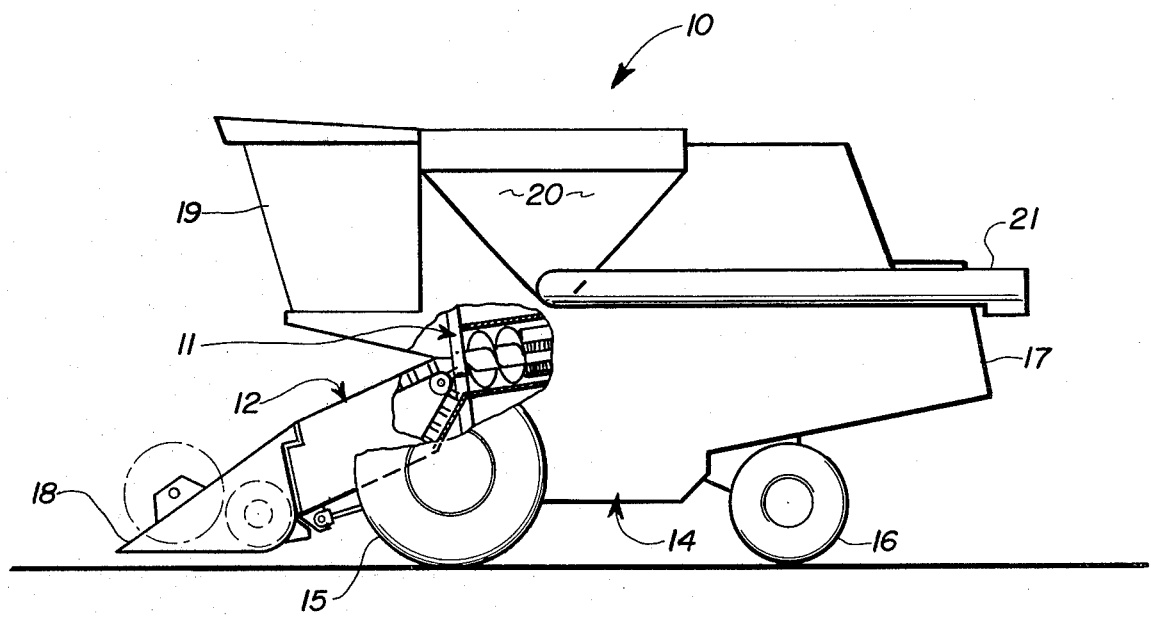
FIG. 1 is a side elevational view of a combine showing the relative positioning of the infeed housing with respect to the threshing and separating apparatus.

FIG. 1 shows a combine 10 in side elevational view with portions cut away to show the threshing and separating apparatus 11 and a portion of the interior of the infeed housing 12. As can be seen, the combine 10 has a mobile frame, indicated generally by the numeral 14, supported by a pair of primary driving wheels 15 in the front and a smaller pair of steerable wheels 16 in the rear, only one of which is shown for each pair. The combine 10 is powered by an engine (not shown) of relatively high horsepower and usually diesel fuel consuming. The infeed housing 12 is mounted to the forward portion of the combine frame and has attached thereto a header 18. Overlying the infeed housing 12 and a portion of the header 18 is a cab 19. Rearwardly of the cab 19 and centrally positioned atop the combine 10 is a grain tank 20. Crop material is cut and gathered by the header 18, passed through the infeed housing 12 into the threshing and separating apparatus 11 where it is processed. Cleaning apparatus (not shown) next separates the grain from the chaff, the chaff being discharged from the unit. The cleaned grain is then transferred for storage via conventional grain transfer apparatus (not shown) to the grain tank 20. The grain is unloaded from the grain tank 20 utilizing an unloading auger 21. Housing 17, in the form of sheet metal, covers the grain cleaning apparatus and chaff discharge apparatus, both of which are not shown.

Figure 2:
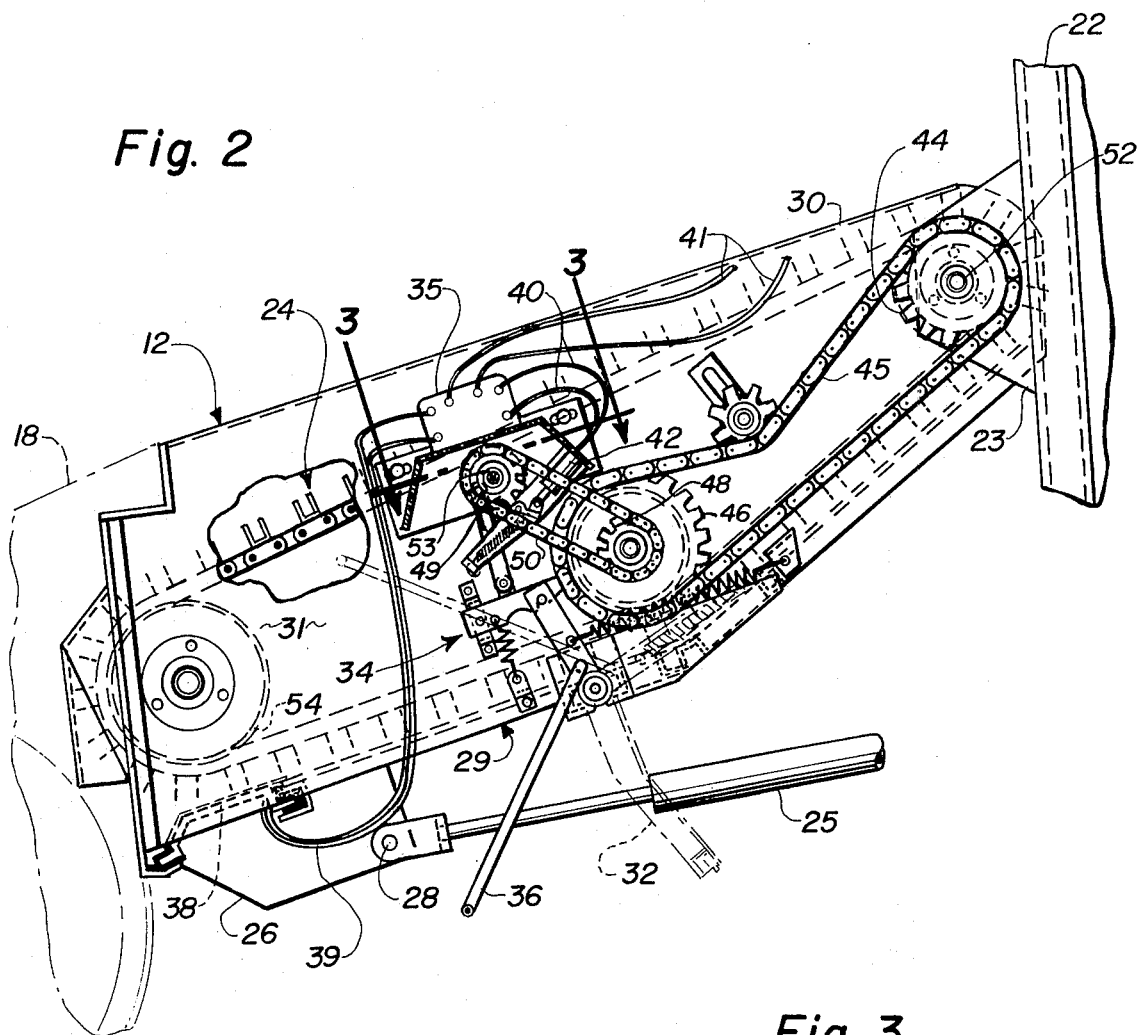
FIG. 2 is a side elevational view of the infeed housing of the combine showing the release mechanism of the present invention, the drive apparatus and the stone detector with which the control apparatus and the stone trapdoor release mechanism cooperates.

Now, referring to FIG. 2 there is shown the infeed housing 12 which is attachable to the front portion of the main frame 14 of the combine 10 of FIG. 1. The infeed housing 12 is shown in side elevational view revealing the critical drive elements and the control apparatus of the instant invention. The front portion of the infeed housing 12 is suitably fastened to header 18, only part of which is shown. The header 18 may be one of several types, all of which gather crop material from the field, generally consolidate the crop material and transfer it upwardly and rearwardly into the infeed housing 12. The rear portion of the infeed housing 12 is suitably pivotably fastened via a pair of brackets 23 (only one of which is shown) to the front support beam 22 of the frame 14, partially shown in FIG. 2. The crop elevator, indicated generally by the numeral 24, is rotatably mounted within the sidewalls of the infeed housing 12 and serves to convey crop material upwardly from the header 18 into the threshing and separating apparatus of rotors 11 of FIG. 1.

The infeed housing 12, with the attached header 18, is pivotably raised and lowered about its attachment point at brackets 23 to the frame 14 by a pair of hydraulic cylinders 25, only one of which is shown in FIG. 2. The hydraulic cylinder 25 is appropriately anchored on one end to the main frame 14 of the combine (not shown) and on the other is movably attached to the infeed housing at mounting plate 26 via a locking pin 28.

The infeed housing 12 of FIG. 2 also has a floor portion, indicated generally by the numeral 29, along which crop material is conveyed by the aforementioned crop elevator 24. The top or covering 30 of the infeed housing 12 and the floor portion 29 are connected by opposing sidewalls 31, only one of which is shown. A downwardly pivoting door 32 is releasably held in place along the floor portion 29, by a latching mechanism, indicated generally by the numeral 34, which is controlled by the electronic circuitry in a control box 35 that is fastened to one of the sidewalls 31 of the infeed housing 12. A handle 36 is attached to the door 32 to permit it to be manually closed.

A stone sensing plate 38 is mounted to the very forward portion of the infeed housing at the front edge of the floor 29 in a manner which acoustically isolates or dampens it from the vibrational noises of the infeed housing 12 and its moving components. When a stone or stone-like object impacts against plate 38 a signal is sent via connecting wires 39 to the control box 35 and the circuitry therein. Upon receipt of a signal within the predetermined range that is characteristic of stones or stone-like objects by the circuitry within the control box 35, which may be of the type described in greater detail in the previously mentioned copending U.S. application Ser. No. 109,932, filed Jan. 4, 1980, a signal is sent via connecting wires 40 to the solenoid 42 (see briefly FIG. 3). Connecting wires 41 run from the control box 35 and the control circuitry therein to a control apparatus, such as an electric clutch, (not shown) to control the drive to the crop elevator 24.

Figure 3:
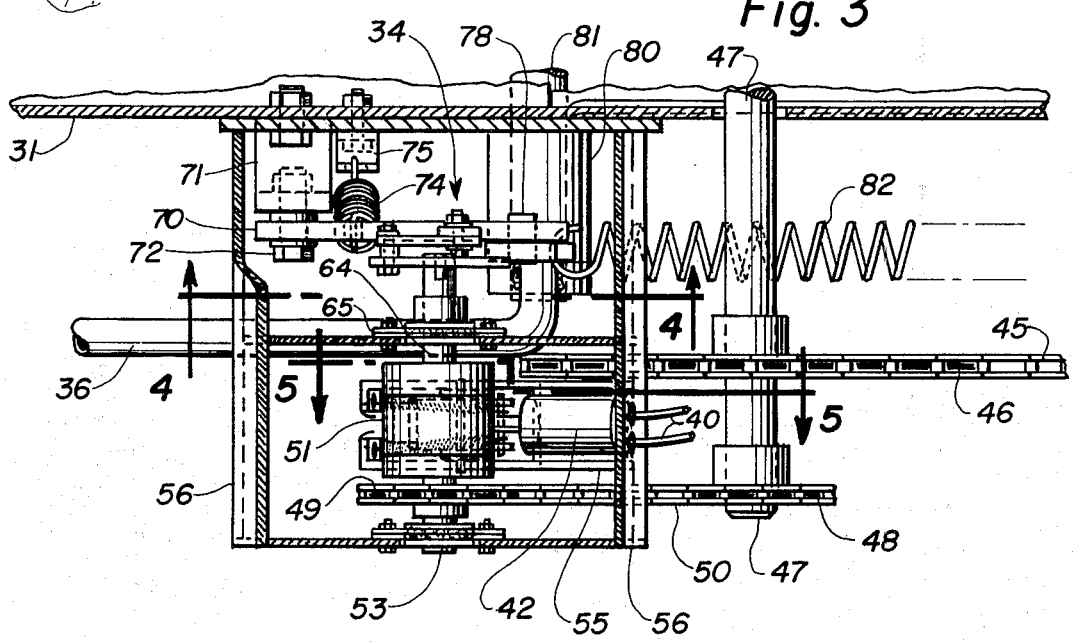
FIG. 3 is a sectional view taken along the lines 3—3 of FIG. 2 showing the solenoid activated spring wound clutch and the latch release mechanism in a top plan view.

This control apparatus, such as an electric clutch, controls the drive to the driving sprocket 44 of FIG. 2, which receives rotary power from the engine of the combine. Driving sprocket 44 is connected by an appropriately sized drive chain 45 to driven sprocket 46. As is best seen in FIG. 3, sprocket 46 is mounted about a rotating shaft 47 which has a smaller second sprocket 48 mounted thereabout. Sprocket 48 is drivingly connected to sprocket 49 by drive chain 50. Sprocket 49 and spring wound clutch 51 are mounted about stub shaft 53 (see FIG. 3). Solenoid 42 is appropriately mounted to side sheet 31 and controls the spring wound clutch 51 in a manner that will be described hereafter.

The drive to the crop elevator 24 is typically transferred through a drive chain (not shown) from an appropriate driving power source, such as a diesel engine, on the base unit of the combine 10 (also not shown). This drives shaft 52, about which the aforementioned sprocket 44 is mounted. The crop elevator 24 passes about a front idler drum 54, which overlies stone sensing plate 38, and at least one intermediate idler sprocket or roll.

Figure 5:
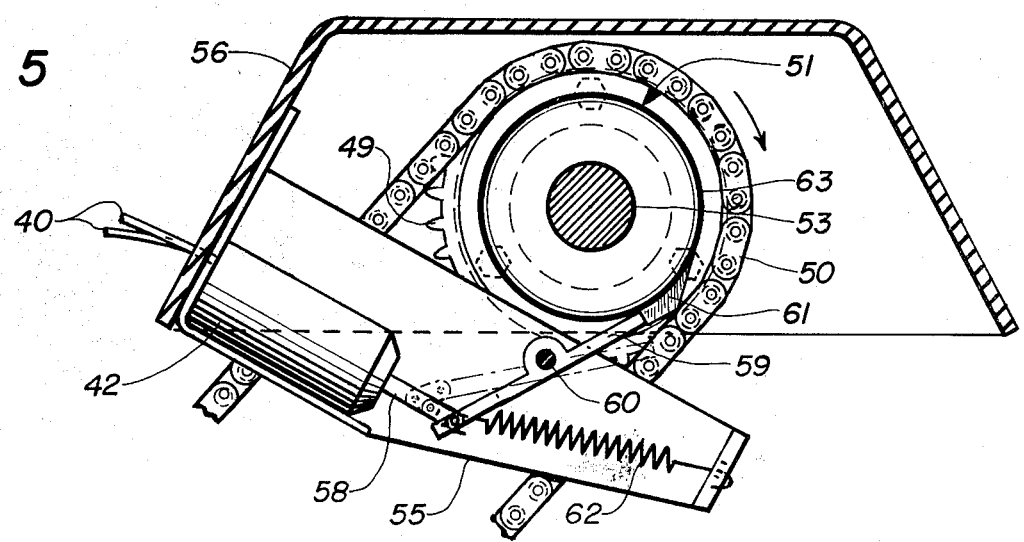
FIG. 5 is a sectional view taken along the line 5—5 of FIG. 3 showing the single revolution spring wound clutch and the solenoid that is utilized to release the latch release mechanism of the stone trapdoor release mechanism.

Shaft 52 transfers the rotary drive through the sprocket 44 to the chain 45 and thence to sprocket 46 and, via shaft 47 and sprocket 48, to sprocket 49 and shaft 53 as previously described. As best seen in FIGS. 3 and 5, solenoid 42 is fastened to a bracket 55 which in turn is fastened to mounting plate 56. Plate 56 is appropriately fastened to the sidewall 31. Solenoid 42 has a plunger 58 which connects with pivoting pawl 59, best seen in FIG. 5. Pawl 59 pivots about pivot pin 60 which is fastened to bracket 55. Pawl 59 engages the stop 61, which is fastened to the sleeve 63 of spring wound clutch 51 when the plunger is in the fully extended position. Pawl 59 is spring biased by a pair of springs 62, only one of which is seen in FIG. 5, appropriately fastened into the end portion of bracket 55, so that the pawl is normally in the engaged position with stop 61.

Figure 4:
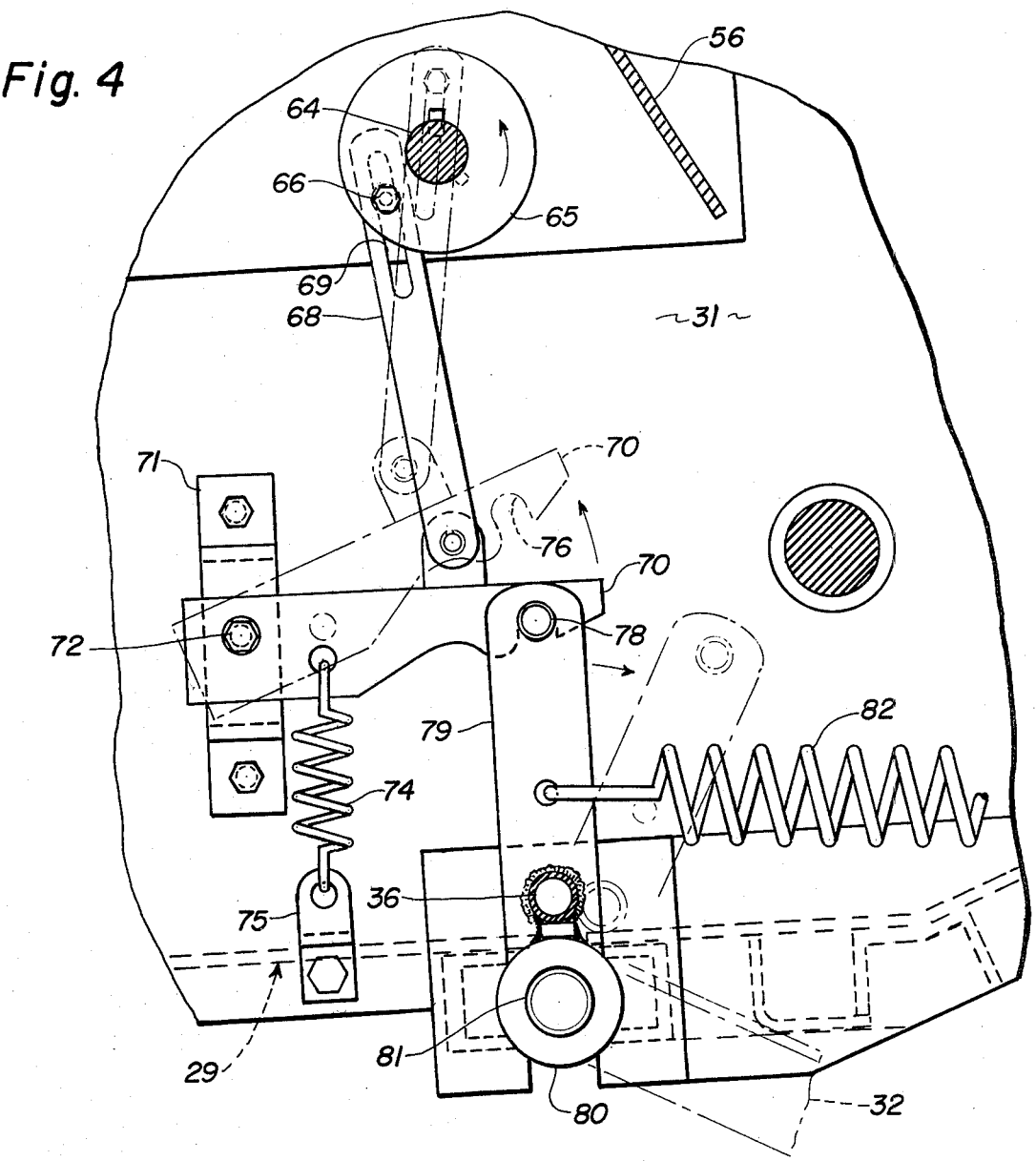
FIG. 4 is a sectional view taken along the lines 4—4 of FIG. 3 showing the operation of the latch release mechanism of the trapdoor in side elevation after the spring wound clutch is released to complete the driving connection for a single revolution along the drive shaft.

Spring wound clutch 51 is of the type standardly available from commercial suppliers, such as Model S, single revolution clutch of the PSI series available from Warner Electric Brake and Clutch Company. The spring wound clutch 51 provides the driving connection from stub shaft 53, seen in FIG. 3, to the adjacent stub shaft 64, to which is fastened rotary disc 65. As best seen in FIG. 4 disc 65 has a retaining nut and bolt 66 by which link 68 is fastened thereto. Link 68 has a slot 69 into which is fitted the retaining nut and bolt 66. Link 68 is movably fastened to latch 70 on its lower end. Latch 70 is pivotally mounted to sidewall 31 via bracket 71 to which journal 72 pivotally mounts latch 70. Latch 70 is spring biased into a downward position by spring 74, which is appropriately fastened to latch 70 and retaining bracket 75. Bracket 75 is mounted to the sidewall 31. Latch 70 has a retaining groove 76 into which retaining pin 78 of lever arm 79 seats when trapdoor 32 is in the fully closed position. Lever arm 79 is fixedly fastened to sleeve 80 which rotates with shaft 81 as trapdoor 32 moves beteen the fully closed and fully opened position. The spring 82 biases lever arm 79, and hence, trapdoor 32 via shaft 81, toward the fully opened trapdoor position.

In operation, the combine 10 is driven across a field of crop material which is harvested by the harvesting attachment or header 18. The header consolidates the crop material via a consolidating auger and transfers the crop material rearwardly and upwardly into the infeed housing 12 where the crop elevator 24 engages the crop material with its chain and slat construction to move the crop material generally rearwardly and upwardly into the threshing and separating apparatus 11. As the crop material enters the infeed housing 12 it passes over the sensing plate 38 mounted along the floor portion 29 of the infeed housing. Any stone or stone-like object included within the crop material must necessarily strike the sensing plate 38 because of the path followed by the crop material beneath the front idler drum 54.

Upon impact with the sensing plate 38, the spectral characteristics of the impacting object are analyzed by the stone detecting circuitry contained within the control box 35. When the object generates a response within the known spectral characteristics of stones or other stone-like objects, the control circuitry within control box 35 sends a signal to solenoid 42. This causes the solenoid plunger 58 to retract, pivoting the pawl 59 out of engagement with the clutch stop 61. This releases the single revolution spring wound clutch 51 to permit the driving connection between constantly turning stub shaft 53 and shaft 64 to be completed by permitting the spring to tightly close down about stub shafts 53 and 64.

This permits disc 65 to rotate with stab shaft 64 as seen in FIG. 4. This rotation or single revolution causes link 68 to follow a predetermined path which raises latch 70 to which link 68 is attached. The slot 69 permits the latch 70 to be pivoted to the raised portion when retaining nut and bolt 66 are in the twelve o'clock or fully raised position. When the retaining nut and bolt 66 run over center, the slot 69 permits the latch 70 to return to its lowered position.

When latch 70 is raised, the groove 76 disengages from retaining pin 78, thereby permitting the biasing spring 82 to pull the lever arm 79 forwardly and downwardly, or in a clockwise direction as seen in FIG. 4. This causes the trapdoor 32 to pivot from its raised fully closed position to its lowered fully open position about rotating shaft 81. When the clutch 51 has completed a full revolution the pawl 59 has been returned to its stop engaging position by biasing springs 62 and the cessation of the electric signal to the solenoid 42. Pawl 59 engages stop 61 which causes the spring within the spring wound clutch to expand, thereby releasing the driving connection between stub shaft 53 and stub shaft 64. The latch 70 then remains in its lowered position, ready to receive retaining pin 78 when the stone trapdoor 32 is raised manually via handle 36 to the closed position. Thus, there is provided a system which utilizes the existing rotary drive force within the crop elevator drive on the infeed housing 12 to release the stone trapdoor 32 to cause it to spring to the fully opened position upon sensing of a stone or stone-like object by the stone detecting circuitry and related apparatus.

It should be noted that this type of a trapdoor trip mechanism or release mechanism is equally applicable to both a conventional combine and a combine of the axial flow type. In fact, any harvesting machine utilizing an infeed housing or a housing which utilizes a trapdoor may employ a similar type of system.

While the preferred structure in which the principles of the present invention have been incorporated is shown and described above, it is to be understood that the invention is not to be limited to the particular details thus presented, but, in fact, widely different means may be employed in the practice of the broader aspects of this invention. The scope of the appended claims is intended to encompass all obvious changes in the details, materials and arrangements of parts which will occur to one of ordinary skill in the art upon a reading of this disclosure.

Having thus described the invention, what is claimed is:

1. In an infeed housing having:
   (a) a rigid frame with an inlet end and an outlet end connected by a pair of opposing sides interconnecting a top covering and a floor, the floor further having a mounted door movable between a first closed position and a second open position;
   (b) conveying means movably mounted within the infeed housing effective to convey crop material from the inlet end to the outlet end;
   (c) shaft means rotatably mounted to the infeed housing connected to the conveying means;
   (d) drive means connected to the shaft means effective to drive the conveying means;
   (e) stone sensing means connectable to the infeed housing effective to detect the presence of stone-like objects among the crop material;
   (f) control means cooperable with the stone sensing means to receive an input signal from the stone sensing means when a stone-like object is detected and to send an output signal;
   (g) a solenoid fastened to the infeed housing connectable to the door and the control means so as to receive the output signal from the control means;
   (h) release means movably mounted to the frame and cooperable with the door and the shaft means effective to selectively permit the door to move from the first closed position to the second open position; and
   (i) a spring wound clutch mounted about the shaft means cooperable with the solenoid and the release means and movable between a first non-power transferring position and a second power transferring position so that upon receipt of the output signal by the solenoid the clutch is moved from the first non-power transferring position to the second power transferring position thereby causing the release means to release the door to move the door from the first closed position to the second open position.

2. The apparatus according to claim 1 wherein the stone sensing means further includes a sensing plate fastened to the floor adjacent the inlet end of the infeed housing.

3. The apparatus according to claim 2 wherein the control means further comprises an electronic circuit connected to the sensing plate effective to receive input signals from the sensing plate and identify the presence of stone-like objects in the crop material within a characteristic spectral range.

4. The apparatus according to claims 2 or 3 wherein the release means further comprise a first link movably connected to a second link, the second link being mounted for pivotal movement by means fastened to the frame and cooperable with a third link to latch therewith when the door is in the first closed position and being unlatched therefrom when the door moves between the first closed position and the second open position.

5. The apparatus according to claim 4 wherein the first link is further connected to a disc rotatably mounted to the shaft.

6. The apparatus according to claim 5 wherein the shaft means further comprises at least a first end and an adjacent second shaft, the first shaft being constantly driven and the second shaft being driven when the spring wound clutch is in the second power transferring position.

* * * * *